(12) United States Patent
Kapoor et al.

(10) Patent No.: US 7,724,754 B2
(45) Date of Patent: May 25, 2010

(54) DEVICE, SYSTEM AND/OR METHOD FOR MANAGING PACKET CONGESTION IN A PACKET SWITCHING NETWORK

(75) Inventors: Pankaj Kapoor, Germantown, MD (US); Fongchi Rex Chang, Andover, MA (US); Jackie Lee Manbeck, Jr., Herndon, VA (US)

(73) Assignee: Texas Instruments Incorporated, Dallas, TX (US)

( * ) Notice: Subject to any disclaimer, the term of this patent is extended or adjusted under 35 U.S.C. 154(b) by 748 days.

(21) Appl. No.: 11/442,319

(22) Filed: May 30, 2006

(65) Prior Publication Data

US 2007/0201499 A1 Aug. 30, 2007

Related U.S. Application Data

(60) Provisional application No. 60/776,389, filed on Feb. 24, 2006.

(51) Int. Cl.
*H04L 12/28* (2006.01)
*G06F 15/16* (2006.01)

(52) U.S. Cl. .................. 370/412; 370/232; 370/254; 370/310; 370/395.21; 370/468; 709/229; 709/230; 709/232; 709/235

(58) Field of Classification Search ......... 370/230–248, 370/389–474; 709/229–235
See application file for complete search history.

(56) References Cited

U.S. PATENT DOCUMENTS

| | | | | |
|---|---|---|---|---|
| 6,640,248 B1 * | 10/2003 | Jorgensen | ................... | 709/226 |
| 6,707,817 B1 * | 3/2004 | Kadambi et al. | ............ | 370/390 |
| 6,904,015 B1 * | 6/2005 | Chen et al. | ................... | 370/235 |
| 6,914,883 B2 * | 7/2005 | Dharanikota | ............. | 370/230.1 |
| 6,975,638 B1 * | 12/2005 | Chen et al. | ................... | 370/412 |
| 6,996,117 B2 * | 2/2006 | Lee et al. | .................... | 370/429 |
| 6,999,420 B1 * | 2/2006 | Chiu et al. | ................... | 370/231 |
| 7,009,973 B2 * | 3/2006 | Cao et al. | ................... | 370/392 |
| 7,020,143 B2 | 3/2006 | Zdan | | |
| 7,082,133 B1 * | 7/2006 | Lor et al. | .................... | 370/392 |
| 7,088,678 B1 * | 8/2006 | Freed et al. | ................. | 370/230 |
| 7,197,044 B1 * | 3/2007 | Kadambi et al. | ............ | 370/418 |
| 7,251,216 B2 * | 7/2007 | Dube et al. | ................. | 370/232 |
| 7,251,218 B2 * | 7/2007 | Jorgensen | ................... | 370/235 |
| 7,283,558 B2 * | 10/2007 | Ferolito | ..................... | 370/462 |
| 7,349,403 B2 * | 3/2008 | Lee et al. | ............... | 370/395.21 |
| 7,426,209 B2 * | 9/2008 | Ayres | ...................... | 370/395.4 |
| 7,558,890 B1 * | 7/2009 | Li et al. | ....................... | 710/52 |

(Continued)

*Primary Examiner*—Ayaz R Sheikh
*Assistant Examiner*—Venkatesh Haliyur
(74) *Attorney, Agent, or Firm*—Steven A. Shaw; W. James Brady; Frederick J. Telecky, Jr.

(57) ABSTRACT

A network infrastructure device includes a receiver operable to receive packets when operably connected to a communication network; and a processor cooperatively operable with the transceiver. The processor can receive a packet on an interface corresponding to the transceiver. Also, the processor can map the packet to one of several queues and to one of several classifications, based on an indication of priority of handling in a header in the packet and/or an indication of priority in a configuration of the interface. The processor also checks for congestion in the queues with respect to the classification of the packet, and checks for congestion in the one queue with respect to the one classification. The processor queues the packet if there is no congestion, otherwise the processor drops the packet.

6 Claims, 4 Drawing Sheets

U.S. PATENT DOCUMENTS

| | | | |
|---|---|---|---|
| 7,564,869 B2 * | 7/2009 | Cafiero et al. | 370/466 |
| 7,583,664 B2 * | 9/2009 | Ho et al. | 370/386 |
| 2002/0031086 A1 | 3/2002 | Welin | |
| 2002/0075805 A1 * | 6/2002 | Gupta et al. | 370/235 |
| 2002/0075875 A1 * | 6/2002 | Dravida et al. | 370/395.21 |
| 2002/0194369 A1 * | 12/2002 | Rawlins et al. | 709/238 |
| 2003/0023846 A1 * | 1/2003 | Krishna et al. | 713/162 |
| 2003/0032391 A1 * | 2/2003 | Schweinhart et al. | 455/12.1 |
| 2003/0189943 A1 | 10/2003 | Gorti et al. | |
| 2004/0223500 A1 * | 11/2004 | Sanderson et al. | 370/395.53 |
| 2006/0140226 A1 * | 6/2006 | Ho et al. | 370/539 |
| 2006/0153179 A1 * | 7/2006 | Ho et al. | 370/386 |
| 2006/0239188 A1 * | 10/2006 | Weiss et al. | 370/229 |
| 2007/0053352 A1 * | 3/2007 | Corcoran | 370/389 |
| 2007/0058632 A1 * | 3/2007 | Back et al. | 370/392 |
| 2007/0195773 A1 * | 8/2007 | Tatar et al. | 370/392 |
| 2007/0201499 A1 * | 8/2007 | Kapoor et al. | 370/412 |
| 2008/0259798 A1 * | 10/2008 | Loh et al. | 370/235 |

* cited by examiner

DEVICE, SYSTEM AND/OR METHOD FOR MANAGING PACKET CONGESTION IN A PACKET SWITCHING NETWORK

CROSS-REFERENCE TO RELATED APPLICATIONS

This application claims the benefit of provisional application Ser. No. 60/776,389 filed 24 Feb. 2006, which is expressly incorporated herein by reference.

FIELD OF THE INVENTION

The present invention relates in general to packet switching networks, and more specifically to managing congestion of packets within a network infrastructure device.

BACKGROUND OF THE INVENTION

When a device that forwards packets in a packet switching network, such as a router in the Internet, receives too many packets, the router can become deadlocked. That is, the aggregate of all the packet flows exceeds the router's capacity to handle the packets. A router experiencing a deadlock can drop packets indiscriminately.

Because a particular communication is subdivided into packets, packets belong to particular communication flows. The packets which are dropped by the router are dropped without accounting for properties of the various communication flows.

The packets can carry varying types of content, including voice, video, gaming, data, and the like. When the packets are dropped, the dropped packets can cause delays in the midst of a communication. The user can experience, for example, choppy voice communications or blurry video.

SUMMARY OF THE INVENTION

Accordingly, one or more embodiments of the present invention provide a network infrastructure device having a receiver operable to receive packets when operably connected to a communication network; and a processor cooperatively operable with the transceiver. The processor can provide for receiving a packet on an interface corresponding to the transceiver. Also, the processor can map the packet to one of several queues and to one of several classifications, the mapping being determined on an indication of priority of handling in a header in the packet, and/or an indication of priority in a configuration of the interface. The processor can first check for congestion in the queues with respect to the classification of the packet and check for congestion in the one queue with respect to the one classification. Further, the processor can queue the packet if there is no congestion, otherwise the processor can drop the packet.

One or more embodiments provides for a computer-implemented method, implemented on a network infrastructure device in a packet switching network, for managing packet congestion. At a network infrastructure device, a packet is obtained from one of several ingress queues, where respective ingress queues correspond to respective classifications. The packet obtained from the ingress queue is re-marked, the re-marking including translating a classification corresponding to the ingress queue to an equivalent priority of handling in a domain to which the packet is to be transmitted; and the equivalent priority of handling is indicated in the header. The packet obtained from the ingress queue is placed into an egress queue responsive to an interface from which the packet is to be transmitted. There are several egress queues corresponding to each of the interfaces from which packets can be transmitted. Respective egress queues for each egress interface correspond to the respective classifications. The next packet to be transmitted on the interface is selected from the egress queues for the interface from which the packet is to be transmitted, responsive to an egress shaper operating on the egress queues. The next packet can be transmitted from the interface.

Also, one or more embodiments provides for a computer-readable medium with instructions for execution by a computer, where the instructions include a computer-implemented method for managing packet congestion in a network infrastructure device operating in a packet switching network. The instructions can implement the following. Packets can be classified at ingress by an indication of priority of handling in a header in the packets, and/or an indication of priority in a configuration of the interface. The packets can be dropped if ingress queues are congested, and otherwise, the packets can be placed in the ingress queues. There are several ingress queues, each ingress queue corresponding to a respective classification. The packets can be re-marked in accordance with the classification corresponding to the ingress queues. The packets can be placed into the egress queues. There are several egress queues corresponding to each of the interfaces from which packets can be transmitted. Respective egress queues for each interface correspond to respective classifications. The queues can be shaped at egress by selecting the next packets to be transmitted on the interfaces from the egress queues for the interfaces from which the packets are to be transmitted.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
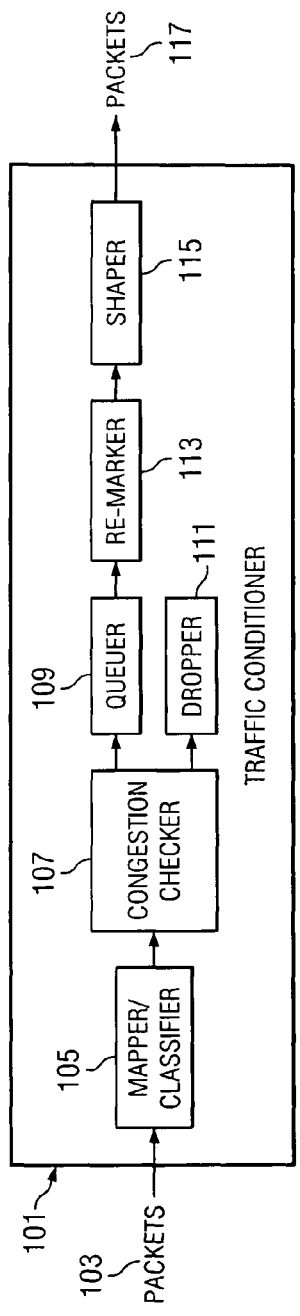
FIG. 1 is a block diagram illustrating an exemplary functional framework for managing packet congestion in a packet switching network.

In overview, the present disclosure concerns communication networks, often referred to as packet switching networks, for example voice over packet (VOP) networks or more particularly voice over Internet protocol (VoIP) networks, such as may be associated with networks supporting packet switched communications between wireless and/or wire line devices. Such communication networks may provide services such as voice communications, data communications, video services, and/or gaming services and the like. Such networks can include network infrastructure devices which transfer the communications between the wireless and/or wire line devices, for example by forwarding the communications which have been broken into communication packets. More particularly, various inventive concepts and principles are embodied in systems, devices, and methods therein for managing packets in a packet switching network.

The network infrastructure devices of particular interest are those receiving and forwarding packets over communications services networks, such as routers, switches, media gateways, centralized media gateways, session border controllers, trunk gateways, media boxes, call servers, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefor, and/or application specific ICs, or a combination thereof. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

A network service provider (NSP) can provide different applications, for example voice over WLAN (wireless local area network) (WME), voice on the box, set-top video or gaming applications for home users. Some of these applications can be associated with minimum latency standards. Moreover, the NSP may prefer to have control over at least some of these applications.

As further discussed herein below, various inventive principles and combinations thereof are advantageously employed to support an IP (Internet protocol) QoS (quality of service) framework which will allow dropping of packets depending on relevant properties. The framework can be provided on the ingress side in addition to the egress side. Furthermore, the framework can be more suitable for an embedded platform than conventional techniques, which call for the packet congestion solution to reside at the egress side and on an IP stack. Moreover, the framework optionally can provide for reserved bandwidth for types of communications.

Further in accordance with exemplary embodiments, a priority of an incoming packet is determined early in the processing of the packet. Also, a determination of whether there is congestion is made at the incoming side of the framework, rather than the outgoing side of the framework, so that the packet can be dropped or queued early in its handling. Moreover, preferential treatment can be provided for particular types of packets, for example, voice packets. Policy routing can be implemented to classify packets.

Control can be provided as described herein at both ingress and egress. Previously, solutions were attempted with scheduling control at egress, but failed to have control at ingress and moreover did not provide rate control at egress. Under heavy loads, packets were dropped at ingress, thereby making the egress controls superfluous. Where voice and data packets co-existed in heavy loads, the problem with early solutions was particularly apparent in the dropping of voice calls.

Figure 2:
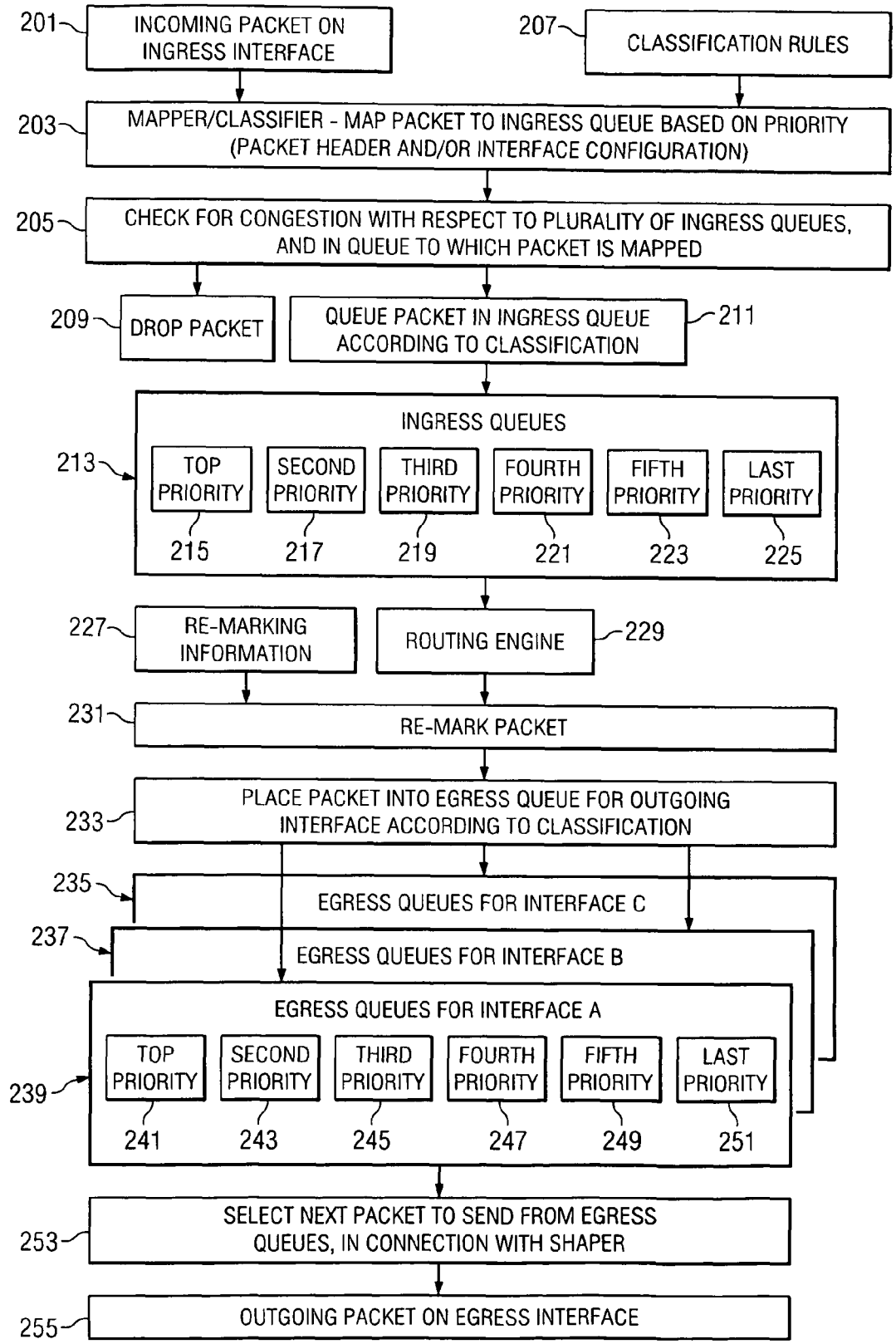
FIG. 2 is a packet flow diagram illustrating an exemplary handling of a packet.

Referring now to FIG. 1, a block diagram illustrating an exemplary functional framework for managing packet congestion in a packet switching network will be discussed and described. The discussion below in connection with FIG. 2 provides more detail on packet flow which can be through the framework.

The framework can include a traffic conditioner 101, which can receive packets 103 at an ingress side and transmit packets 117 from an egress side. The traffic conditioner can include a mapper/classifier 105, a congestion checker 107, a queuer 109, a dropper 111, a re-marker 113, and a shaper 115. In overview, the mapper/classifier 105 can map an incoming packet 103 to a classification; the packet can be queued in an ingress queue based on its classification. The congestion checker 107 can check the ingress queues for congestion. If there is congestion, the dropper 111 can drop the packet. If there is no congestion, the queuer 109 can queue the incoming packet 103 in the appropriate ingress queue, according to the classification of the packet. When the egress interface is determined, the packet is retrieved from the ingress queue, and is placed into a corresponding egress queue for the egress interface. Each egress interface can have egress queues for each classification. The re-marker 113 can remark the packets prior to egress, to reflect the classification depending on the properties of the egress domain. The transmitted packets 117 are selected from the egress queues, optionally according to the shaper 115, and then transmitted. These functions are discussed more in detail below.

A packet received in a stream of incoming packets 103 is directed to the mapper/classifier 105. The framework can take into account the various domains to which it might be attached: DSCP (differentiated services code point) domain, IP TOS (type of service) domain, VLAN (virtual local area network)—Layer 2 user priority tagged domain, and others. The header of incoming packets contains information reflecting the priority of handling assigned to the packet. The priority of handling is not directly compatible across the various domains.

The packets can be classified by the mapper/classifier 105 into classifications in response to their priority of handling (according to the domain in which the packet is received), the ingress interface, and/or the packet content (for example, TCP (transmission control protocol) protocol information, UDP (user datagram protocol) protocol information or MAC (media access control) address). Six classifications can be conveniently used and are illustrated herein, although more or fewer classifications may be provided.

Conveniently, a top priority classification can be used for EF (expedited forwarding) traffic, a lowest priority classification can be used for BE (best effort) traffic, and the middle classification(s) can be used for AF (assured forwarding) traffic. The classifications can conveniently be referred to as classes of service, with top priority being denominated CoS1, next priority being CoS2, and so on.

More particularly, rules can be used by the mapper/classifier 105 to determine the classification of the packet. As an example, the source interface can be used to determine the priority of the packet. For example, the mapper/classifier 105 can use a rule that states that a packet on a particular source interface will be treated as best effort traffic, that is, lowest priority classification. This can be used, for example, to treat packets from all bridge connections as best-effort traffic.

Another rule can provide that if a packet is marked with a VLAN tag, the user priority bits in the VLAN header are honored. As another example, a rule can provide that if the packet has a DSCP marked, that priority is honored.

Another rule can utilize a packet content lookup table which can allow users to construct policy routing utilizing additional fields, for example, source MAC address, source IP address, source network, destination IP address, destination network, source port, destination port, and/or protocol. A default can be provided for packets that do not fit any rule, for example, to default to best effort priority.

The mapper/classifier 105 optionally can provide a "security mode," which can prevent malicious use of packets. Security mode can provide for trusted mode and untrusted mode.

In trusted mode, priority markings in the packet are assumed to be correct. For example, in trusted mode, Layer 2 and Layer 3 priority fields are assumed to be correct; and/or packets received on a WAN (wide area network) interface controlled by an ISP (Internet service provider) are assumed to be correct. In trusted mode, classification rules can be applied in the following order: (1) source interface, (2) Layer 2 user priority bits if present are honored, (3) layer 3 TOS if present is honored, (4) Layer 3 payload database, and (5) if no match classify packet in lowest priority classification.

The foregoing is provided by way of example, because the fields which are trusted can be selected by a user. For example, in Layer 2 mode, the user bits only can be honored; while in Layer 3 mode, the VLAN priority bits are ignored and the TOS byte can be used for classification. As yet another example, in Layer 3 mode the TOS byte can be used for classification, unless it is zero in which case the packet content lookup table can be checked.

In untrusted mode, the priority marks reflected in a packet are not honored. For example, a virus on a LAN computer can overwhelm a router by sending packets with high priority markings. The classification rules in untrusted mode can be, for example: (1) check Layer 3 packet content lookup table, (2) if no match in the packet content lookup table, assign the packet to the lowest classification.

Ingress queues can be provided, such that there is a correspondence between an ingress queue and a classification. The correspondence between ingress queue and classification can be one-to-one. When an incoming packet 103 has been classified by the mapper/classifier 105, it can be placed in the ingress queue corresponding to its classification.

The congestion checker 107 can measure congestion in the ingress queues. If a network infrastructure device (such as a router) is being overwhelmed with more packets than it can handle, packets which have a lower priority are preferentially dropped before packets with a higher priority. This can help critical communications to not be interrupted by bursts of low priority communications.

Accordingly, the classifications can include a top priority class, and voice packets mapped to the top priority classification are not dropped unless all of the ingress queues are congested. Moreover, the packet switching network can be a voice over packet (VOP) network and the packets can include voice packets.

Congestion can be determined by measuring occupancy of the ingress queue of a class. Various known techniques for determining congestion can be implemented. Such techniques include for example random early detection (RED), Blue, and variants, and similar techniques. Advantageously, congestion can be determined utilizing queue length. More particularly, congestion can be determined utilizing instantaneous queue length, rather than average queue length, packet loss, or link utilization. In addition to the first check of the ingress queue for the particular class, a second check of congestion can be determined on the ingress queues for all classes. Accordingly, one or more embodiments provides for performing at least the first checking, second checking, queuing and dropping at an ingress side of the processor.

If it is determined that there is no congestion, the queuer 109 can queue the incoming packet 103 in the appropriate ingress queue, according to the classification of the packet. There is an ingress queue corresponding to each classification. So, for example, if there are six classifications, there are six ingress queues, each corresponding to respective classifications. The packet can be queued in the ingress queue corresponding to the packet's priority, as determined by the mapper/classifier 105.

If there is congestion, the dropper 111 can drop the incoming packet. Alternatively, the dropper 111 can select a packet to drop from a queue, drop the selected packet, and cause the incoming packet to be queued. The packet to be dropped can be selected, for example, by utilizing a tail drop policy, random drop policy, drop front policy, or other packet dropping policy.

The classification for the incoming packet and the packets in the ingress queues determine which packet is to be dropped. For example, the following rule may be implemented:

(1) packets in the ingress queue (or the incoming packet) corresponding to the lowest priority classification are dropped first;

(2) if there is still congestion, drop packets in the ingress queue (or the incoming packet) corresponding to the next lowest priority classification;

(3) repeat for other classifications;

(4) if there is still congestion, drop packets in the ingress queue (or the incoming packet) belonging to the highest priority classification.

The re-marker 113 can remark the packets, dependent on the properties of the egress domain. A packet can be remarked to reflect the priority for the packet, dependent on the properties of the egress domain. The egress domain can be known because the egress interface (on which the packet will be transmitted) can be associated with a domain. The classification associated with the packet can be translated to an equivalent priority of handling for the outgoing domain, and the packet can be re-marked with the appropriate indications for the equivalent priority of handling. Rules can be applied by the re-marker 113 to translate the classification to the priority of handling for the outgoing domain For example, where the egress domain is the Layer 2 VLAN user priority, the user priority field in the VLAN header can be marked to reflect the classification of the packet; where the egress domain is the IP TOS domain, the TOS byte can be remarked, for example, per a traffic conditioning agreement; where the egress domain is the DSCP domain, there is no need to remark the packets because the ingress mappings have already done so, alternatively, a lookup table can be provided to overwrite the DSCP; and where the egress domain is not differentiated services (DS) compliant, the DSCP in the header can be set to zero. The foregoing are provided by way of example, to illustrate the variety of re-marking which can be provided.

Accordingly, the re-marking can include translating the classification mapped to the packet to an equivalent priority of handling in a domain to which the packet is to be transmitted, and indicating the equivalent priority of handling in the header.

Re-marking can be performed at ingress, for example before the incoming packets are placed in or retrieved from the ingress queues, or at egress, for example before or after the outgoing packets are placed in or retrieved from the egress queues.

The shaper 115 can determine which packets are selected from the egress queues, for transmission over the egress interface. For each set of queues related to an egress interface, the shaper can utilize various known techniques to select a next packet to be transmitted. For example, a hierarchical token bucket algorithm or a priority weighted round robin algorithm can be utilized for any egress interface. As another example, priority based precedence can be utilized. Accordingly, the respective classifications can correspond to respective priorities, and the selecting is performed in accordance with the priorities.

The shaper 115 can be a rate shaper, reserving a portion of a total bandwidth on an interface to support a data rate for particular classifications. Thus, where the total bandwidth for an interface is for example 256 kb/second, 100 kb/second can be reserved for voice communications (top priority classification), and the remainder can be used for data communications (middle priorities). Such preferential treatment for voice communications can decrease latency. The shaper determines the classification from which the next packet to be selected, in order to provide the data rates for the interface.

Referring now to FIG. 2, a packet flow diagram illustrating an exemplary handling of a packet will be discussed and described. In overview of the illustration, an incoming packet 201 flows through a mapper/classifier 203, a congestion checker 205, a packet queuer 211, and/or a packet dropper 209. The incoming packet will also flow through a packet re-marker 231, in this example after being handled by a standard routing engine 229, prior to being placed in one of the egress queues 235, 237, 239 for the corresponding egress interface. An outgoing packet selector selects the next packet to send from the egress queues, in connection with a shaper 253. These functions are discussed more in detail below.

The incoming packet 201 is received on one of the ingress interfaces. The mapper/classifier 203 maps the packet to an ingress queue and determines the classification of the packet based on the priority of handling assigned to the packet. The priority of handling can be determined from the packet header and/or the interface configuration. Classification rules 207 can be provided for the mapper/classifier 203 to identify settings in the packet to be checked for priority of handling, optionally with other information affecting the priority of handling, and with a map to classification. Some or all of the rules can conveniently utilize a packet content lookup table and/or a header lookup table. In this example, the packet will be determined to have a classification of top priority, second priority, third priority, fourth priority, fifth priority, or last priority; the packet will be associated with the determined classification. Ingress queues 213 are provided, with an ingress queue 215, 217, 219, 221, 223, 225 corresponding to each classification.

Congestion can be checked 205 as previously described with respect to all of the ingress queues, and/or with respect to the ingress queue corresponding to the classification associated with the packet. That is, queue-specific congestion is checked in the ingress queue 215, 217, 219, 221, 223, 225 corresponding to the packet's classification; and optionally overall congestion is checked in the ingress queues 213.

If there is congestion, the incoming packet or one of the packets in the ingress queues can be selected and dropped 209, as previously described. If it is determined that there is no congestion, the packet queuer 211 can queue the incoming packet in the ingress queues 213. Particularly, the incoming packet is queued into the ingress queue corresponding to the packet's classification.

When the packet has been queued in one of the ingress queues 213, the packet can be processed according to conventional techniques. For example, the standard routing engine 229 can be notified of the incoming packet, and can perform standard routing processes on the packet. Such processes can include determining a next node to which the packet will be transmitted, and other known processes in this field.

The incoming packet will also flow through the packet re-marker 231, in this example after being handled by the standard routing engine 229, prior to being placed in the egress queue 235, 237, 239 for the corresponding egress interface. However, the incoming packet can be re-marked at any of several points in the flow. For example, the incoming packet can be re-marked prior to being placed in one of the ingress queues, while in one of the ingress queues, while being placed in one of the egress queues, after being retrieved from one of the egress queues, or just prior to being transmitted. Furthermore, it may be convenient to distribute portions of the re-marking to different points in the packet flow.

Re-marking information 227 can be provided, such as rules for the re-marker 231 to identify settings in the packet to be set to reflect priority of handling corresponding to the classification for the egress domain. Some or all of the rules can conveniently utilize a packet content lookup table and/or a header lookup table. The proper re-marking information can be determined from the classification of the packet and the domain to which the packet is to be transmitted (typically specified by the routing engine 229 or other processing). The packet can be modified to insert the proper re-marking information.

The packet can be queued 233 into one of the egress queues 235, 237, 239 for the interface from which the packet is to be transmitted. More particularly, the packet can be queued in the egress queue having a classification corresponding to the classification of the packet. For example, if the incoming packet 201 is determined by the mapper/classifier 203 to have a classification of top priority, it is initially queued in the top priority ingress queue 215; it is eventually queued in the top priority egress queue for the interface on which it will be transmitted, such as top priority egress queue 241 for interface A.

The next outgoing packet 255 to be sent from an egress interface can be selected by the packet selector 253 from the egress queues 235, 237, 239, optionally in connection with a shaper. An egress interface can operate independently and asynchronously of the other egress interfaces. Consequently, the outgoing packet selector 253 and optional shaper can operate on the egress queues for the particular egress interface. The outgoing packet 255 can then be transmitted from the egress interface in accordance with known techniques. Accordingly, one or more embodiments can include transmitting the next packet from the interface. Accordingly, one or more embodiments provides for a computer-readable medium comprising instructions for execution by a computer, the instructions including a computer-implemented method for managing packet congestion in a network infrastructure device operating in a packet switching network. The instructions implement: (A) classifying a plurality of packets at ingress by at least one of an indication of priority of handling in a header in the packets and an indication of priority in a configuration of the interface, dropping the packets if ingress queues are congested, and otherwise placing the packets in the ingress queues, wherein there are a plurality of ingress queues each corresponding to a respective classification; (B) re-marking the packets in accordance with the classification corresponding to the ingress queues, and placing the packets into the egress queues, wherein there are a plurality of egress queues corresponding to each interface of a plurality of interfaces from which packets can be transmitted, wherein respective egress queues in each of the plurality of egress queues correspond to respective classifications; and (C) shaping the queues at egress by selecting the next packets to be transmitted on the interfaces from the plurality of egress queues for the interfaces from which the packets are to be transmitted.

Figure 3:
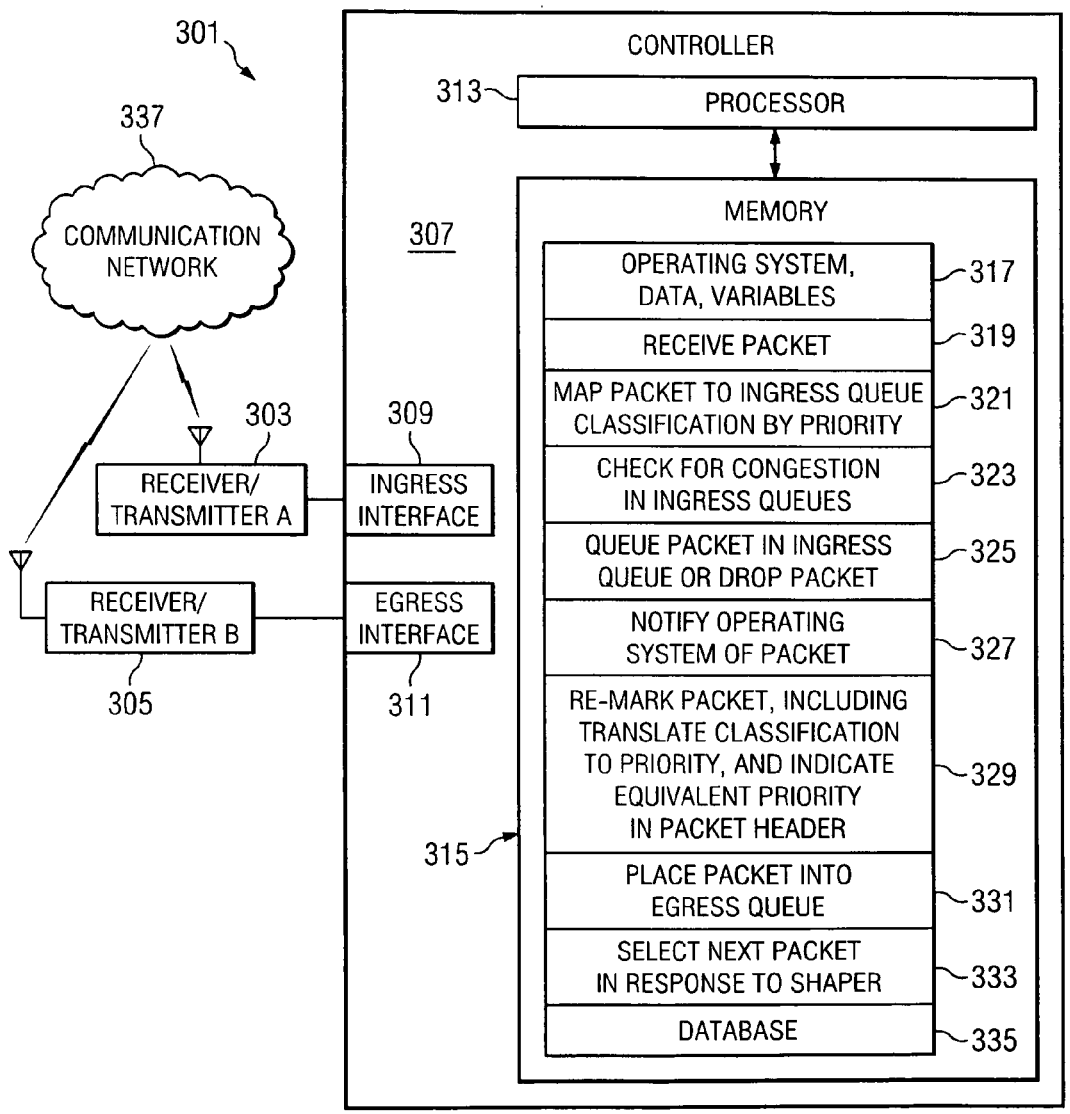
FIG. 3 is a diagram illustrating portions of an exemplary network infrastructure device.

Referring now to FIG. 3, a diagram illustrating portions of an exemplary network infrastructure device 301 will be discussed and described. The network infrastructure device 301 may include a number of receivers and transmitters, which are represented here by receiver and/or transmitter A 303, and receiver and/or transmitter B 305, which communicate with a communication network 337. The network infrastructure device can include one or more controllers 307. The controller 307 may include a processor 313, a memory 315, and other optional components, which will be well understood to those in this field.

The communication network 337 can be a packet switching network, particularly a voice over packet (VOP) network, or more particularly a voice over IP (VoIP) network.

The processor 313 may be, for example, one or more microprocessors and/or one or more digital signal processors. The memory 315 may be coupled to the processor 313 and may comprise a read-only memory (ROM), a random-access memory (RAM), a read/write flash memory, a programmable ROM (PROM), and/or an electrically erasable read-only memory (EEPROM). The memory 315 may include multiple memory locations for storing, among other things, an operating system, data and variables 317 for programs executed by the processor 313; computer programs for causing the processor to operate in connection with various functions such as receiving 319 a packet, mapping 321 the packet to an ingress queue classification by priority, checking 323 for congestion in the ingress queues, queuing 325 the packet in the ingress queue or dropping the packet, notifying 327 the operating system of the packet re-marking 329 the packet, placing 331 the packet into an egress queue, and selecting 333 the next packet in response to a shaper; and a database 335 of various information used by the processor 313. The computer programs may be stored, for example, in ROM or PROM and may direct the processor 313 in controlling the operation of the network infrastructure device 301. Each of these computer programs is discussed by way of example below.

The processor 313 may be programmed for receiving 319 a packet. Responsive to signaling from the receiver/transmitter A 303, packets can be received on an ingress interface 309. In accordance with instructions stored in memory 315, the processor 313 may input packets received via the ingress interface 309 for further processing, described below. Similarly, packets can be transmitted from the receiver/transmitter B 305, via an egress interface 311, in accordance with instructions stored in memory 315. Although a wireless communication connection is illustrated, a wireline connector can be provided, and the receiver/transmitter can be omitted. The ingress interface 309 and the egress interface 311 can be associated with, among other things, a domain. Accordingly, the network infrastructure device can include a transmitter, and the processor can be configured to facilitate receiving packets from a receiving domain in accordance with the receiver, and transmitting packets to a domain on which the packet is to be transmitted, in accordance with the transmitter.

The processor 313 may be programmed for mapping 321 an incoming packet to an ingress queue classification by a priority of handling that is associated with the packet, which is described and will not be repeated here. Also, the processor 313 may be programmed for checking 323 for congestion in the ingress queues, as previously described. Further, the processor 313 may be programmed for queuing 325 the packet in the ingress queue or dropping the packet, as previously described.

The processor 313 may be programmed for notifying 327 the operating system, the routing engine, or other upper layer handling of the packet, when the incoming packet is queued, so that an incoming packet from the ingress queues can be processed. Accordingly, the processor can include an operating system, and can notify the operating system that the packet has been received if the packet is queued.

The processor 313 can be programmed for the following, which have also been previously described in detail: re-marking 329 the packet; placing 331 the packet into an egress queue; selecting 333 the next packet, optionally in response to a shaper.

Accordingly, there is provided a network infrastructure device. The network infrastructure device includes a receiver operable to receive packets when operably connected to a communication network; and a processor cooperatively operable with the transceiver. The processor is configured to facilitate receiving a packet on an interface corresponding to the transceiver. Also, the processor can map the packet to one queue of a plurality of queues and to one classification of a plurality of classifications, the mapping being determined on at least one of an indication of priority of handling in a header in the packet and an indication of priority in a configuration of the interface. Moreover, the processor can first check for congestion in the plurality of queues with respect to the one classification of the packet and second checking for congestion in the one queue with respect to the one classification. Also, the processor can queue the packet if there is no congestion, otherwise drop the packet.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Moreover, variations can include functions on the ingress side (such as the packet mapping/classifying 321, congestion checking 323, and ingress queuing 325) and omit functions on the egress side (such as egress queuing 331, and selecting the next outgoing packet 333), or vice versa. In addition, different realizations can incorporate the re-marking 329 at various points throughout the ingress/egress. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 4:
FIG. 4 is a diagram illustrating exemplary layered processing.

FIG. 4 is a diagram illustrating exemplary layered processing. This example illustrates representative layers: Layer 2, the driver 401; Layer 3, the routing layer 405; various other layers 407; and an application layer 409. A packet is received and processed in accordance with known means at the various layers. For example, an incoming packet is initially received at the physical layer (not illustrated); passed to Layer 2, the driver 401; and then sequentially passed to layers above for additional processing. A packet that is to be transmitted is directed from an upper layer (such as the illustrated application layer 409) to successively lower layers for further processing; eventually to Layer 2, the driver 401; and then is transmitted from the physical layer (not illustrated). Consequently, one can refer to an ingress side and an egress side of packet flow or processing. The ingress side directs packets received from a layer below to a layer above for processing; the egress side directs packets to the layer below. Conventions associated with the physical layer, Layer 2, Layer 3, Layer 4, and the like are well known.

Also illustrated in FIG. 4 is a logical interface—IP framework layer 403. In this example, the IP framework layer 403 is located between Layer 3 and Layer 2. The IP framework layer 403 can alternatively be realized in any layer below the application layer. The IP framework layer 403 can be utilized to provide some or all of the functions discussed herein, such as the mapper/classifier, congestion checker, queuer, dropper, re-marker and shaper. The IP framework layer 403 also has an ingress side and an egress side.

Accordingly, the selecting responsive to an egress shaper is performed at an egress side at a layer below an application layer of the network infrastructure device. Furthermore, classifying and dropping can be performed at a layer below an application layer. Moreover, the shaping can be performed below an application layer.

Figure 5:
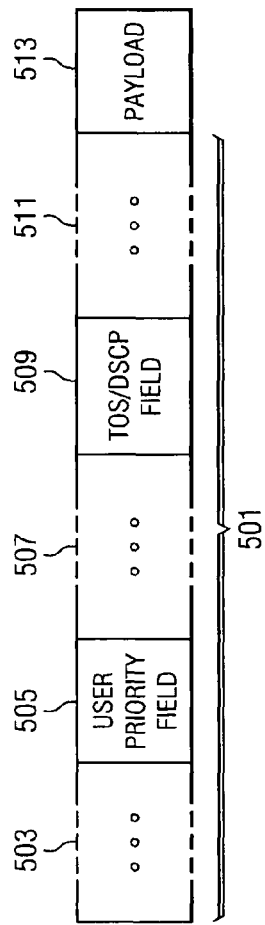
FIG. 5 is a block diagram illustrating portions of an exemplary packet.

FIG. 5 is a block diagram illustrating portions of an exemplary packet. The packet that is received or transmitted by the network infrastructure device is in a format, prescribed by a protocol, which typically includes one or more headers 501, a payload 513, and can include other fields which are omitted from this discussion to avoid obscuring the discussion but will be known in the industry.

The header(s) 501 includes information reflecting the priority of handling. In the illustrated packet, the both Layer 2 and Layer 3 headers are included. The fields in the header(s) 501 are assigned according to the protocol, including by way of example a user priority field (or bit(s)), a type of service field (or bit(s)), and a code point field (or bit(s)). Additional information relevant to the priority of handling can be located in the payload 513, for example TCP protocol information, UDP protocol information, or MAC address in the packet content. The illustrated header 501 includes various fields 503, 507, as well as fields reflecting priority of handling including a user priority field 505 and/or a TOS/DSCP (combination type of service/differentiated services code point) field 509. The fields reflecting priority of handling in a packet as received at the ingress interface are formatted according to the network connected to the ingress interface. The fields reflecting priority of handling can be re-marked to reflect an equivalent priority of handling in the form of the network connected to the egress interface. For example, an incoming packet on an interface associated with the IP TOS domain can be re-marked for transmission on interface associated with the DSCP domain. Accordingly, the field of the packet that is re-marked can include at least one of the user priority field, the type of service field, and the code point field.

Figure 6:
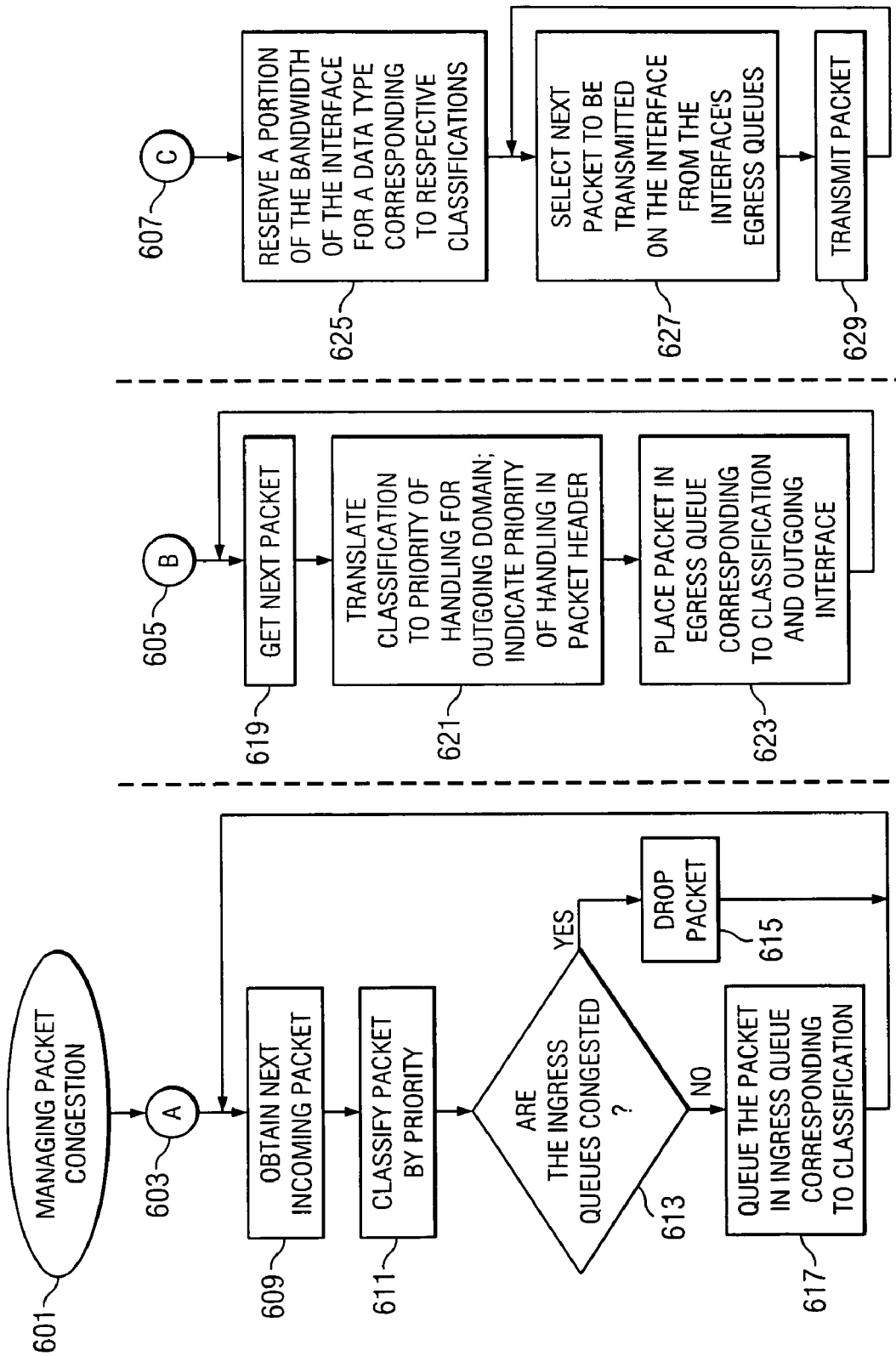
FIG. 6 is a flow chart illustrating an exemplary procedure for managing packet congestion.

FIG. 6 is a flow chart illustrating an exemplary procedure 601 for managing packet congestion. The procedure 601 can advantageously be implemented on, for example, a processor of a controller, described in connection with FIG. 3 or other apparatus appropriately arranged.

The example procedure 601 includes three parallel portions A, B, C: the ingress portion A 603, the egress portion C 607, and the re-marking portion B 605. The ingress portion A 603 can operate on incoming packets. The egress portion C 607 can operate on outgoing packets. The re-marking portion B 605 can be realized in connection with the ingress portion A 603, the egress portion C, or separately. For example, the re-marking portion B 605 can be performed on an incoming packet after the ingress portion A 603 has processed the incoming packet; or the re-marking portion B 605 can be performed prior to an outgoing packet being queued in the egress queue. The three parallel portions are outlined separately below. Details which have been covered above are, however, not repeated.

The ingress portion A 603 obtains 609 the next incoming packet, for example from one of the interfaces that received the packet. Then, the procedure classifies 611 the packet according to the priority of handling that the packet is associated with, due to the priority of handling indicated in the packet and/or the priority of handling assigned to the interface where the packet was received. Thus, the packet becomes associated with a classification.

Next, the ingress portion checks 613 whether the ingress queues are congested. If the ingress queues are congested, a packet is dropped in accordance with a drop policy. If the ingress queues are not congested, the procedure queues 617 the packet in the ingress queue corresponding to the classification associated with the packet. The ingress portion repeats the procedure for obtaining 609 the next incoming packet, classifying 611 the packet, checking 613 for congestion, dropping 615 and queuing 617.

The egress portion C 607 can be performed for each egress interface. The procedure optionally reserves 625 a portion of the bandwidth of the egress interface, where the reserved portion(s) of the bandwidth corresponds to one or more of the classifications. The bandwidth reservations can be referenced when shaping the outgoing packets. Accordingly, the egress shaper can reserve a portion of a bandwidth associated with the interface for at least one particular data type, wherein data types correspond to the respective classifications, and the classification of the packet determines a portion of the bandwidth corresponding to the packet.

The re-marking portion B 605 can get 619 the next packet to be remarked, for example, the just-processed incoming packet on the ingress side or the next outgoing packet. Then the procedure can translate 621 the classification associated with the packet to a priority of handling for the outgoing domain; and can indicate the priority of handling in the packet, for example in the header. The procedure then can queue 623 the re-marked packet in the egress queue corresponding to the classification for the packet and to the outgoing interface on which the packet will be transmitted.

Then, the procedure can select 627 the next packet to be transmitted on the interface from the interface's egress queues. Various known queue selection algorithms can be utilized. The selection optionally can be performed in accordance with a shaper, utilizing the reserved bandwidth(s), if any. The selected packet can be transmitted 629. The egress portion can repeat the procedure for selecting 627 the next outgoing packet and transmitting 629 the packet on the egress transmission interface.

Accordingly, there can be provided a computer-implemented method, implemented on a network infrastructure device in a packet switching network, for managing packet congestion. The method can include at the network infrastructure device, obtaining a packet from an ingress queue of a plurality of ingress queues, where respective ingress queues correspond to respective classifications of a plurality of classifications. Also included can be, at the network infrastructure device, re-marking the packet obtained from the ingress queue, the re-marking including translating a classification corresponding to the ingress queue to an equivalent priority of handling in a domain to which the packet is to be transmitted, and indicating the equivalent priority of handling in the header. Further provided at the network infrastructure device, can be placing the packet obtained from the ingress queue into an egress queue responsive to an interface from which the packet is to be transmitted, where there are a plurality of egress queues, including the egress queue, corresponding to each interface of a plurality of interfaces from which packets can be transmitted, where respective egress queues in each of the plurality of egress queues correspond to the respective classifications. Also, the network infrastructure device can provide for selecting the next packet to be transmitted on the interface, from the plurality of egress queues for the interface from which the packet is to be transmitted, responsive to an egress shaper operating on the plurality of egress queues.

Moreover, the re-marking can include instructions for translating the classification to an equivalent priority of handling in a domain to which the packet is to be transmitted, and indicating the equivalent priority of handling in the header.

It should be noted that the communication networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector in combination with a data transfer protocol such as USB (universal serial bus), or similar.

Furthermore, the term network infrastructure device denotes a device or software that receives packets from a communication network, determines a next network point to which the packets should be forwarded toward their destinations, and then forwards the packets on the communication network. Examples of network infrastructure devices include devices and/or software which are sometimes referred to as routers, edge routers, switches, bridges, brouters, gateways, media gateways, centralized media gateways, session border controllers, trunk gateways, call servers, and the like, and variants or evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A network infrastructure device comprising:
   a receiver operable to receive packets when operably connected to a communication network; and
   a processor cooperatively operable with the receiver, the processor being configured to facilitate:
   receiving a packet on an interface corresponding to the receiver;
   mapping the packet to one single queue of a plurality of queues and to one classification of a plurality of classifications, the mapping being determined on at least one of an indication of priority of handling in a header in the received packet and an indication of priority in a configuration of the interface, each queue of the plurality of queues corresponding to a different classification;
   first checking for overall congestion in all of the queues, and second checking for congestion in the one single queue corresponding to the one classification; and
   queuing the received packet in the one single queue when there is no overall congestion and no congestion in the one single queue, and when there is overall congestion or congestion in the one single queue, selecting one of the packets in the plurality of queues having a lower classification than the received packet, preferentially dropping the selected one of the packets, and queuing the received packet in the one single queue;
   performing at least the first checking, second checking, queuing and dropping at an ingress side of the processor, the plurality of queues being ingress queues, the processor being further configured to facilitate:
   obtaining one of the packets from one of the plurality of ingress queues;

re-marking the obtained packet in accordance with the classification corresponding to the ingress queues;

placing the obtained packet into an egress queue corresponding to both an egress interface from which the obtained packet is to be transmitted and the classification of the obtained, and a plurality of egress queues corresponding to each egress interface from which the packets can be transmitted;

transmitting packets from each of the plurality of egress queues available for each egress interface of a plurality of egress interfaces, wherein each egress queue of the plurality of egress queues for one of the egress interfaces corresponding to different classifications; and shaping the plurality of egress queues for each egress interface by selecting the next packet to be transmitted from the egress interface from the plurality of egress queues for the egress interface, responsive to an egress shaper operating on the plurality of egress queues.

2. The network infrastructure device of claim 1, wherein the processor is further configured to include an operating system, further comprising notifying the operating system that the packet has been received if the packet is queued.

3. The network infrastructure device of claim 1, wherein the communication network is a voice over packet (VOP) network.

4. The network infrastructure device of claim 1, wherein the classifications include a top priority class, voice packets being mapped to the top priority classification, the processor being configured to preferentially select a lower priority packet in one of the ingress queues for dropping when there is congestion, packets with the top priority class not being dropped until all of the ingress queues are congested.

5. The network infrastructure device of claim 1, wherein the processor is further configured to facilitate re-marking the packet, the re-marking including translating the classification mapped to tile packet to an equivalent priority of handling in a domain to which the packet is to be transmitted, and indicating the equivalent priority of handling in the header.

6. The network infrastructure device of claim 5, further comprising a transmitter, wherein the processor is further configured to facilitate receiving packets from a receiving domain in accordance with the receiver, and transmitting packets to a domain on which the packet is to be transmitted, in accordance with the transmitter.

* * * * *